United States Patent [19]

Cok

[11] Patent Number: 5,631,979

[45] Date of Patent: May 20, 1997

[54] PIXEL VALUE ESTIMATION TECHNIQUE USING NON-LINEAR PREDICTION

[75] Inventor: David R. Cok, Rochester, N.Y.

[73] Assignee: Eastman Kodak Company, Rochester, N.Y.

[21] Appl. No.: 249,645

[22] Filed: May 26, 1994

Related U.S. Application Data

[63] Continuation of Ser. No. 965,955, Oct. 26, 1992, abandoned.

[51] Int. Cl.$^6$ .................................................. G06K 9/36
[52] U.S. Cl. ........................ 382/263; 348/246; 348/394; 382/274; 382/167
[58] Field of Search ............................ 382/30, 34, 54, 382/56, 263, 167, 274; 348/246, 247, 394, 409, 411, 415

[56] References Cited

U.S. PATENT DOCUMENTS

| | | | |
|---|---|---|---|
| 4,144,547 | 3/1979 | Stoffel | 348/411 |
| 4,191,974 | 3/1980 | Ono et al. | 358/261 |
| 4,259,693 | 3/1981 | Aaron et al. | 358/261 |
| 4,363,036 | 12/1982 | Subramaniam | 358/261.2 |
| 4,464,686 | 8/1984 | Reitmeier | 358/314 |
| 4,485,399 | 11/1984 | Schulz et al. | 358/314 |
| 4,498,104 | 2/1985 | Schulz | 382/54 |
| 4,630,307 | 12/1986 | Cok | 382/27 |
| 4,776,029 | 10/1988 | Shimura | 382/56 |
| 4,783,840 | 11/1988 | Song | 382/54 |
| 4,809,350 | 2/1989 | Shimoni et al. | 382/56 |
| 4,815,078 | 3/1989 | Shimura | 371/30 |
| 4,876,595 | 10/1989 | Veldhuis | 348/411 |
| 4,916,525 | 4/1990 | Drummond | 358/12 |
| 4,941,053 | 7/1990 | Hienerwadel et al. | 348/415 |
| 4,994,927 | 2/1991 | Dixit et al. | 358/426 |
| 5,020,121 | 5/1991 | Rosenberg | 382/56 |
| 5,038,388 | 8/1991 | Song | 382/54 |
| 5,054,100 | 10/1991 | Tai | 382/54 |
| 5,148,497 | 9/1992 | Pentland et al. | 382/54 |
| 5,184,218 | 2/1993 | Gerdes | 358/140 |
| 5,231,680 | 7/1993 | Williams | 358/314 |
| 5,327,246 | 7/1994 | Suzuki | 348/246 |
| 5,329,599 | 7/1994 | Curry et al. | 382/54 |
| 5,404,411 | 4/1995 | Banton et al. | 382/54 |

OTHER PUBLICATIONS

"Pel Pattern Predictive Coding of Dithered Images" Yoshida et al *IEEE International Conference On Communications*, vol. No. 1, Jun. 19–22, 1983, pp. 463–467.

*Primary Examiner*—Stephen Chin
*Assistant Examiner*—Timothy J. May
*Attorney, Agent, or Firm*—Raymond L. Owens

[57] ABSTRACT

A pixel value estimation technique uses non-linear prediction to estimate a pixel value before the pixel is known, based on previous values seen. Initially, a number of classes are defined. Each class is a template for a pattern of pixel values. The pixels constituting the support for the prediction of a given pixel are compared to each template. A value giving the goodness of fit to each template is determined as well as a predicted pixel value based on that template. The predictions from each template are averaged together using weights related to the goodness of the fit to that template to produce a consolidated prediction.

8 Claims, 3 Drawing Sheets

PIXEL VALUE ESTIMATION TECHNIQUE USING NON-LINEAR PREDICTION

This is a continuation of application Ser. No. 965,955, filed 26 Oct. 1992, now abandoned.

TECHNICAL FIELD

The present invention is directed to the field of image manipulation and, more particularly, to use of non-linear prediction for pixel value estimation, such as is used for image compression.

BACKGROUND ART

Many image compression techniques utilize the DPCM method. In this method the image is transmitted in a raster scanned fashion. Based on the previously transmitted information, a prediction or estimate of the value of the next pixel is made. Only the difference between the predicted value and actual value is actually transmitted. The residuals have a much smaller range of values than the actual pixel values and can be transmitted with many fewer bits per pixel than the actual pixel values can be transmitted. Since both the transmitter and receiver use the same method of prediction based on information which both have available, the receiver will make the same prediction as the transmitter and can faithfully reconstruct the image.

The predictor used in the classical DPCM method is a linear combination of some subset, called the support, of the values already transmitted. One common such subset is the just prior pixel on the same line, together with the three nearest pixels on the previous line. The problem with the linear combination technique is that it behaves poorly on edges. In some work, it has been proposed that the coefficients making up the linear combination be allowed to vary based on the information already transmitted, making the technique slowly adaptive. This still does not respond quickly enough to rapid changes in the image, and edges in the image still cause large residuals which degrade the performance of the compression technique.

It is seen then that there exists a need for an improved method of pixel value estimation, particularly for use in image compression, which overcomes the problems associated with the prior art.

SUMMARY OF THE INVENTION

This need is met by the pixel value estimation technique according to the present invention, wherein non-linear prediction is used.

In accordance with one embodiment of the present invention, non-linear prediction is used for pixel estimation. Initially, a number of classes are defined. Each class is a template for a pattern of pixel values. The pixels constituting the support for the prediction of a given pixel are compared to each template. A value giving the goodness of fit to each template is determined as well as a predicted pixel value based on that template. The predictions from each template are averaged together using weights related to the goodness of the fit to that template to produce a consolidated estimate of the unknown pixel value.

It is an object of the present invention to use non-linear prediction for pixel value estimation. It is a further object of the present invention to use this pixel value estimation method for any case where estimation of pixel values are needed, such as in image compression or where a pixel value is missing in an image. It is an advantage of the present invention that this pixel value estimation method can be used in the context of either lossy or lossless compression. It is a further advantage of the present invention that the present invention can be used in transmitting multi-band images. The pixel values in different layers can be predicted with template predictors just as the pixels in a single-layer image can be predicted.

These and other objects of the present invention will become more apparent when taken in conjunction with the following description and drawings wherein like characters indicate like parts and which drawings form a part of the present description.

DETAILED DESCRIPTION OF THE PREFERRED EMBODIMENT

Figure 1:
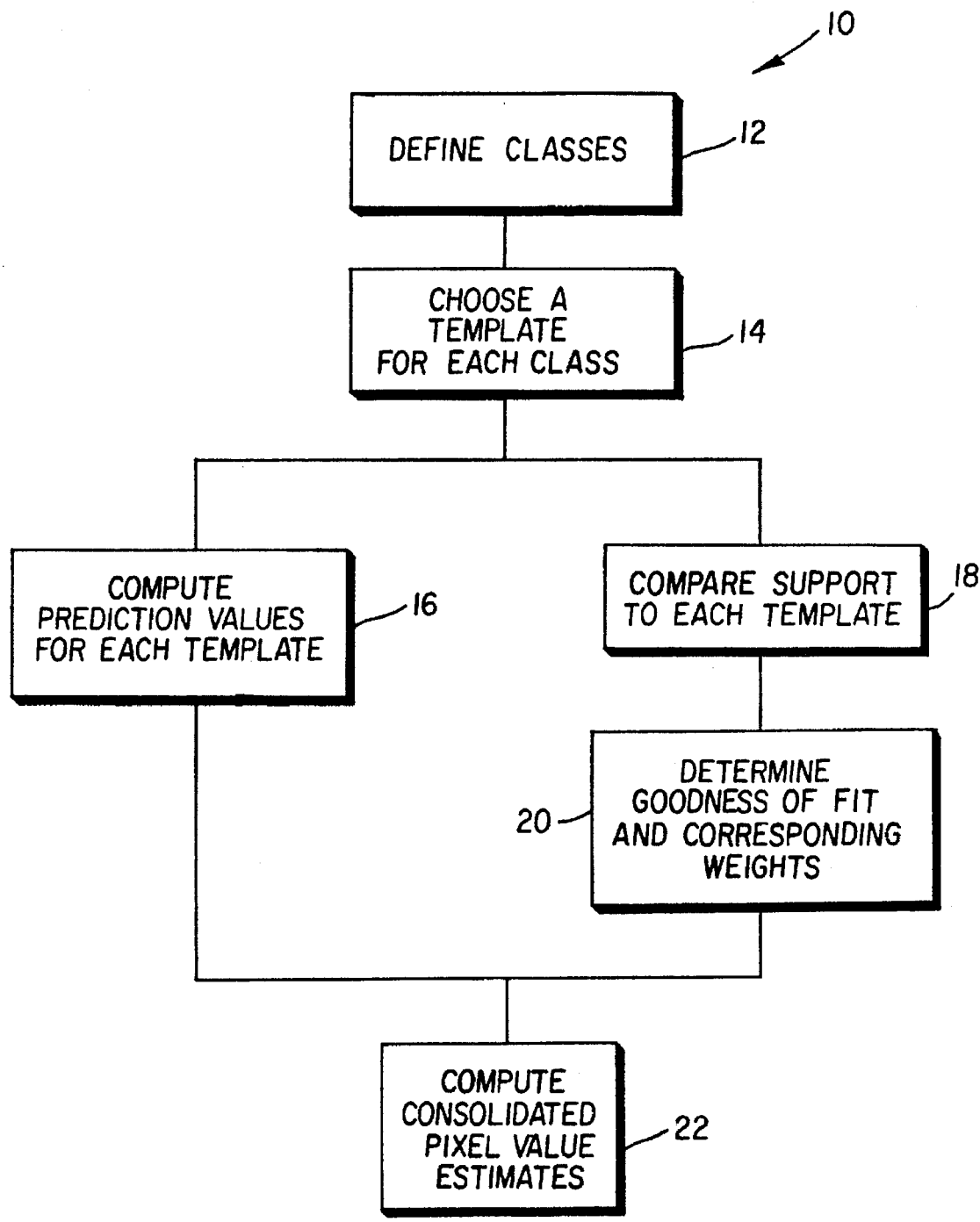
FIG. 1 illustrates a flow diagram showing the sequence of steps for estimating pixel values in accordance with the present invention.

In the present invention, non-linear prediction is used to estimate pixel values, which can be used to provide improved image compression. Referring to the drawings, FIG. 1 illustrates a flow diagram 10, showing the sequence of steps for estimating pixel values in accordance with the present invention. Initially, at block 12, a number of classes are defined, depending on the particular application desired. For example, an image generated by computer graphics consists primarily of uniform areas and sharp edges; the classes used for such images would recognize features such as a uniform neighborhood and various orientations of sharp edges and thin lines. An image of a natural scene would also have edges of various orientation as classes, but in addition would allow for neighborhoods containing smoothly varying brightness or color gradations. Each defined class is then assigned a template for a pattern of pixel values, as shown by block 14.

The quality of the pixel estimate and, thus, of resulting image compression, depends on the way in which the templates are used. The templates are chosen based on the characteristics of the image data to be transmitted. If one set of templates serves well for a large domain of images in a given application, that set can be built into compression and decompression hardware of an image compression system. If the domain of images is so variable that the set of templates must differ from image to image, the details of the templates must be transmitted along with the image data as overhead information.

Continuing with FIG. 1, at block 16, at each pixel in the image, prediction values are computed for each template. The pixels constituting support for the prediction of a given pixel are compared to each template, as shown at block 18. A value giving the goodness of fit and corresponding weight to each template is determined at block 20, in addition to the predicted pixel value determination at block 16. Finally, at block 22 the predictions from each template are averaged together using weights related to the goodness of the fit to that template to produce a consolidated pixel value estimate.

The prediction technique of block 16 in FIG. 1 can be used in the context of either lossy or lossless compression.

It can also be used in transmitting multi-band images. The pixel values in different layers can be predicted with template predictors just as the pixels in a single-layer image can be predicted.

In a preferred implementation, the predictors for each template are linear combinations of the values of the pixels constituting the support plus an offset value. This has the advantage of simplicity and ease of implementation in hardware. Although non-linear predictors for each template could also provide an improved prediction, non-linear predictors for templates are not the preferred predictors for pixel value estimation in this embodiment.

Figure 2:
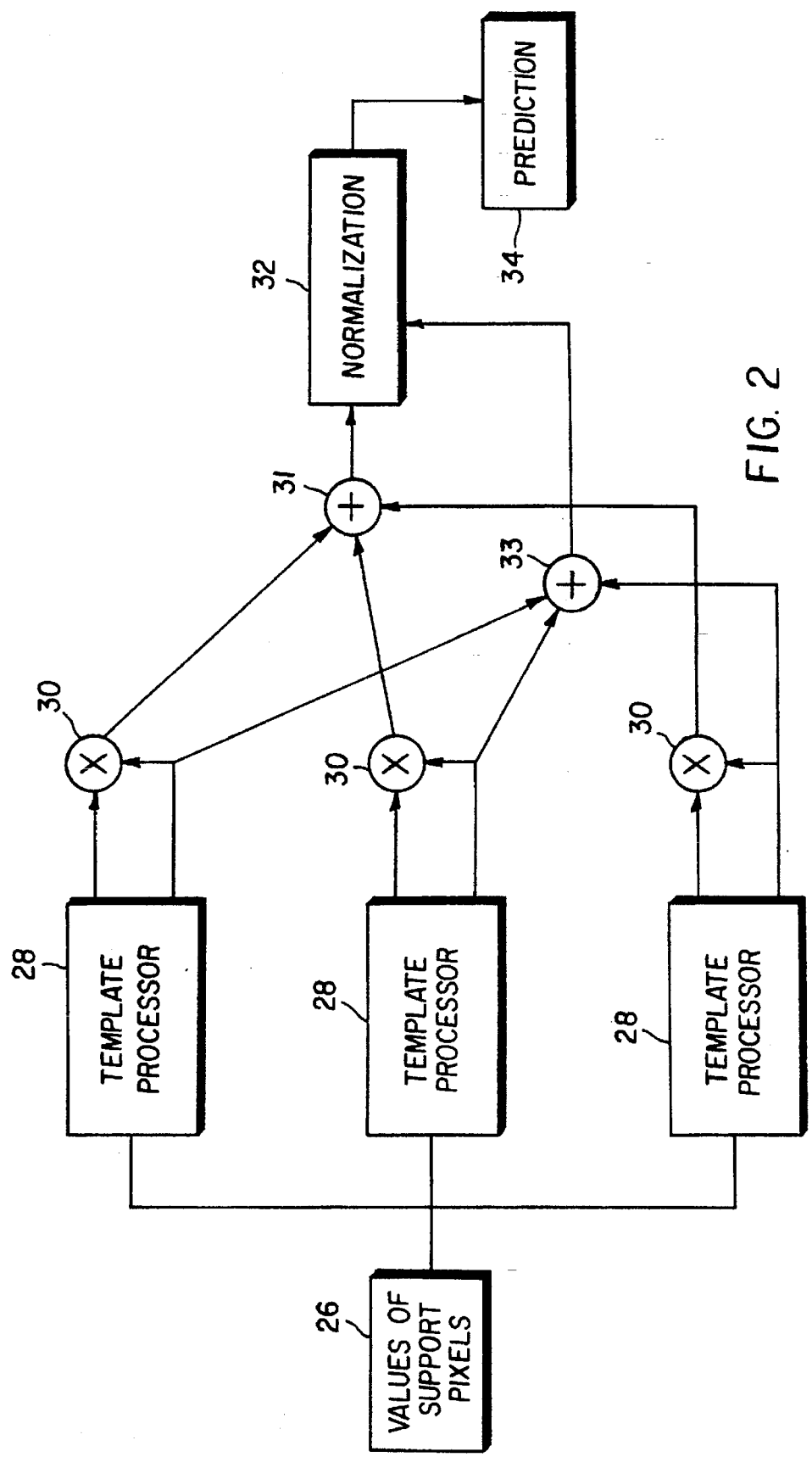
FIG. 2 illustrates a block diagram expansion of the several steps in the pixel value estimation technique shown in FIG. 1.

Referring now to FIG. 2, and continuing with FIG. 1, there is illustrated a block diagram 24 useful for describing the prediction technique of the present invention, which expands on blocks 16, 18, and 20 of FIG. 1. Values of pixels constituting support for the prediction value, from block 18 of FIG. 1, are input from a block 26 in FIG. 2 to one or more template processors 28. The pixels constituting the support for the prediction value of a given pixel are compared to each template at the template processor or processors 28. At multipliers 30, the predictions from each template are multiplied by their corresponding weights. Adder 31 combines the weighted prediction values to produce a total weighted prediction. Adder 33 combines all of the weight values to produce a sum of all the weights. The sum of all the weights from adder 33 is then used in a normalization step at block 32, along with the sum of the weighted prediction values from adder 31, to produce the weighted average, which is a consolidated prediction, at block 34.

In a preferred embodiment of the present invention, the measure of mismatch of the pixel values of the support from the template is a quadratic combination of the values of the support pixels. To convert this to a value for goodness of fit, the result of the quadratic combination is passed through a transfer function which is 1 for a mismatch of 0 and is 0 for large mismatches. The recommended transfer function is an exponential:

(goodness of fit=exp(-mismatch/scale)).

Figure 3:
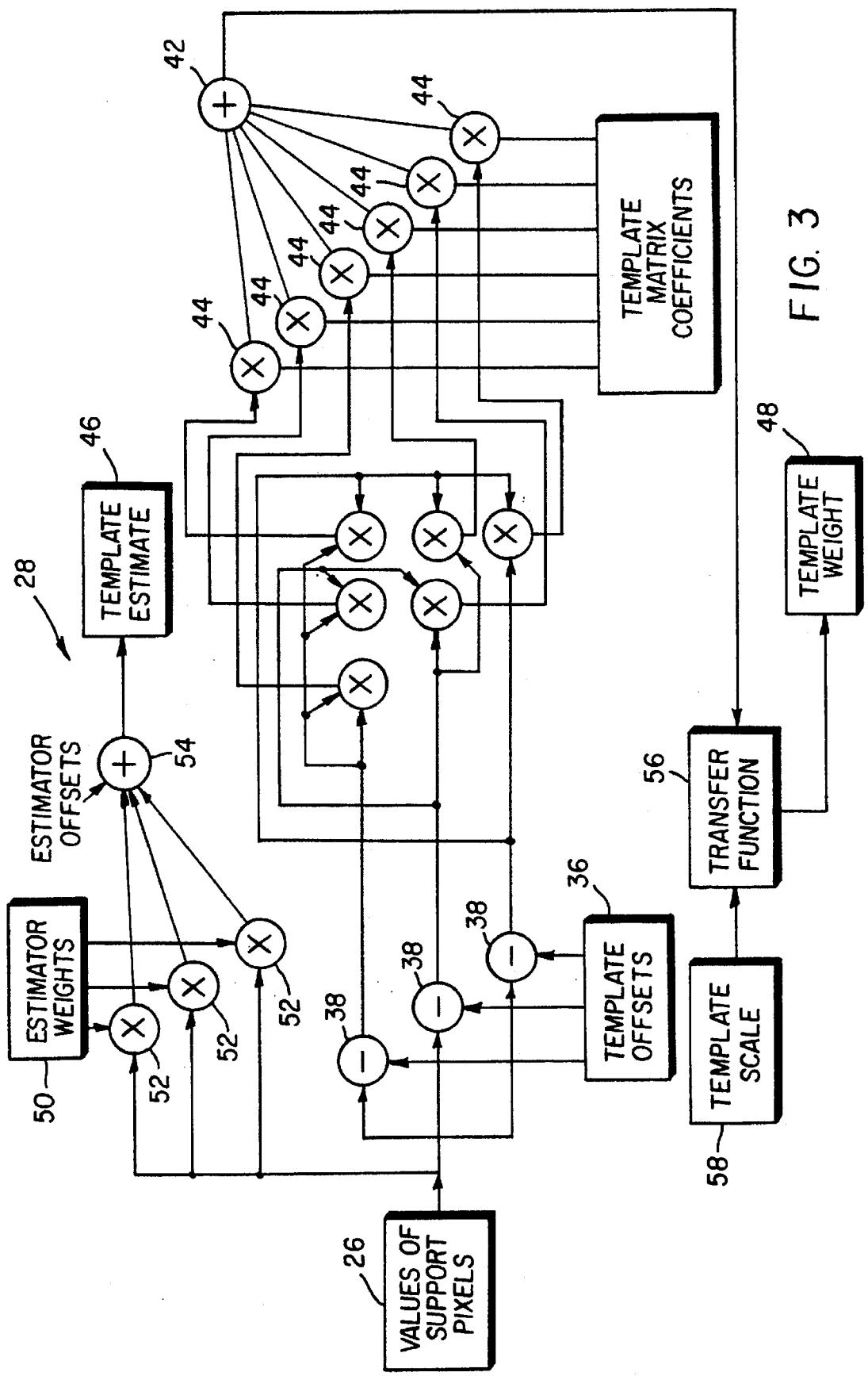
FIG. 3 is a block diagram of a template processor of FIG. 2 for determining template weight and estimate used in the pixel value estimation technique of the present invention.

The mismatch is determined in the following steps illustrated by the template processor 28, shown in FIG. 2 and expanded on in FIG. 3. FIG. 3 is shown for three input pixels, although one or multiple input pixels may be used. Again, the values of pixels constituting support for the prediction value are input from the block 26, as in FIG. 2, to the template processor 28. Template offset values 36 are subtracted from the input pixel values at subtractors 38. Next, the offset input values are multiplied in pairs at multipliers 40. Finally, a weighted sum of these products is performed at summer 42, after the multiplied pairs of offset input values are multiplied by template matrix coefficients at multipliers 44.

Continuing with FIG. 3, the procedure to determine a template estimate 46 and a template weight 48 is diagrammatically illustrated. The values of the support pixels from block 26 are multiplied by estimator weights 50 at multipliers 52, and then added to an estimator offset value at summer 54 to provide the template estimate 46. In addition, the weighted sum value from summer 42 is applied to a transfer function 56, along with a template scale 58 to provide the template weight 48.

The procedure to determine the template estimate 46 and the template weight 48 can be summarized in the following equations, wherein:

Pi=value of ith input pixel value
Oi=ith template offset
ai=ith template prediction coefficient
ao=template prediction offset
Qij=template matrix coefficient
scale=template scale value
A=an amplitude multiplier for the template
Pj=value of jth input pixel value
Oj=jth template offset.

These values are chosen to optimize the performance of the pixel value estimation and, thus, the image compression, using non-linear optimization techniques. Performance in terms of compression or estimation accuracy depends on the choice of these parameters and coefficients, which are chosen based on the images to be compressed, or the pixels to be estimated. Once the desired parameters and coefficients are chosen, the following mathematical equations summarize the signal processing represented by the present invention.

$$\text{template estimate} = ao + \text{sum over } i \text{ of } (Pi * ai); \qquad 1.$$

$$\text{mismatch} = \text{sum over } i \text{ of (sum over } j \text{ of } (Qij*(Pi-Oi)*(Pj-Oj))); \text{ and} \qquad 2.$$

$$\text{template weight} = A*\exp(-\text{mismatch}/\text{scale}). \qquad 3.$$

The overall estimate, which is a weighted average of all of the template weights is given by the following equation:

$$\text{estimate} = (\text{sum over templates of (template estimate * template weight)})/(\text{sum over templates of (template weight)}). \qquad 4.$$

The behavior of the estimation technique depends on the values of template offsets, template prediction coefficients, template prediction offsets, template matrix coefficients, template amplitudes, and template scales listed above for each template, as well as on the number of templates chosen. The parameters and coefficients must be chosen based on the intended class of images whose pixels are to be estimated by this technique. Although it may be time-consuming to determine a good set of values for these parameters, they can be used in reconstruction very efficiently. A good set of values for these parameters can be found using non-linear optimization techniques known in the art.

The pixel value estimation process of the present invention has been described for use in improved image compression for purposes of illustration only, and is not to be considered as being limited to a single application. It will be obvious to persons skilled in the art that the pixel value estimation process described and claimed herein allows for the estimation of a value of an unknown image pixel, based on known values of other image pixels. This process for estimating pixel values may be used for a variety of application requiring estimation of unknown pixel values, such as, for example, to provide improved image compression. In another application, an image may have missing pixel values because of faults in an image scanning device or an image storage device; the pixel value estimation process of the present invention may be used to provide an estimate of those missing pixel values. As another example, there exist electronic image capture devices which employ a CCD array with light sensitive elements. Some of the elements of the CCD are covered with filters of one color and other elements are covered with filters of other colors. As a result, the CCD produces an image with many pixel values missing in any given color band. Again, the pixel value estimation technique of the present invention may be used to estimate these missing pixels. As a further example, the input image may have values for all its pixels, but those values may be contaminated by noise or other defects. The pixel value estimation procedure of the present invention may be used to estimate the correct value of a pixel. In this situation, the noisy value of the original pixel may be part of the support for estimating that correct value of the pixel.

Industrial Applicability and Advantages

The present invention is useful in the field of photography systems, display, and printing systems and has the advantage of being simple enough to be implementable in hardware. The pixel value estimation technique is particularly applicable for providing improved image compression. The image compression is non-linear to the different types of structures within the images of interest, avoiding the usual problems of edges which are either poorly rendered or require a large number of bits to transmit. Since the templates can be chosen to match the application domain, they can be chosen in a way which maximizes the fidelity of the compression or reduces the total number of bits needed to record the image without loss. It is a further advantage that since the pixel estimation technique uses a weighted average over the different templates, it is robust against noise which would otherwise cause oscillation between choice of templates (if one had to choose exactly one template for a given pixel). In addition, use of the pixel estimation technique in image compression does not require the image to be broken into blocks, and thus is not prone to artifacts on block boundaries. Finally, while some image compression techniques make the quantizer which encodes the residuals adaptive based on the pixel values in the support, requiring a more complicated scheme to encode the residual information, the pixel estimation technique of the present invention does not require any changes to the method used to encode the residuals; standard techniques such as Huffman or arithmetic coding can be used for that purpose.

While there has been shown what is considered to be the preferred embodiments of the invention, it will be manifest that many changes and modifications may be made therein without departing from the essential spirit of the invention. In particular, it will be obvious to those skilled in the art that the embodiment described herein in terms of hardware implementation may be simulated in a software program on a general purpose computer, without departing from the scope of the invention as defined in the claims. It is intended, therefore, in the annexed claims, to cover all such changes and modifications as may fall within the true scope of the invention.

I claim:

1. A method for estimating pixel values in an image, comprising the steps of:
   (a) defining templates for patterns of pixels, each template corresponding to one of the patterns of pixels;
   (b) computing predicted values for a missing pixel in the image for each of the patterns of pixels based on the templates corresponding to the patterns of pixels and on pixel values in a neighborhood of the missing pixel;
   (c) determining a closeness of a match between the templates for each of the patterns of pixels and the pixel values in the neighborhood of the missing pixel;
   (d) producing a pixel value estimation as a finalized estimate of the missing pixel based upon the predicted values and the closeness of the match for each of the templates; and
   (e) using the pixel value estimation as the pixel value of the missing pixel in the image.

2. A method for estimating pixel values as claimed in claim 1, wherein the templates are assigned to the patterns of pixels responsive to minimization of an error in the estimation.

3. A method for estimating pixel values as claimed in claim 1, further comprising the step of applying the method for estimating pixel values to determine corrected pixel values from corrupted pixel values.

4. The method for estimating pixel values according to claim 1, further comprising the step of:
   f. transmitting the templates with the image if the templates vary between the image and other images.

5. A method for estimating pixel values in an image, comprising the steps of:
   (a) defining templates for patterns of pixels, each template corresponding to one of the patterns of pixels;
   (b) computing predicted values for a missing pixel in the image for each of the patterns of pixels based on the templates corresponding to the patterns of pixels and on pixel values in a neighborhood of the missing pixel;
   (c) determining a closeness of a match between the templates for each of the patterns of pixels and the pixel values in the neighborhood of the missing pixel;
   (d) producing a pixel value estimation as a finalized estimate of the missing pixel based upon the predicted values and the closeness of the match for each of the templates; and
   (e) determining a replacement for the missing pixel value in a compressed image using the pixel value estimation.

6. A method for estimating pixel values as claimed in claim 5, wherein the templates are assigned to each of the patterns of pixels responsive to minimization of an error in the estimation.

7. A method for estimating pixel values as claimed in claim 5 further comprising the step of applying the method for estimating pixel values to determine corrected pixel values for corrupted pixel values.

8. The method for estimating pixel values according to claim 5, further comprising the step of:
   f. transmitting the templates with the image if the templates vary between the compressed image and other compressed images.

* * * * *